United States Patent [19]

Adams

[11] 4,405,271
[45] Sep. 20, 1983

[54] CONVERTIBLE RAIL-HIGHWAY VEHICLE CHASSIS

[76] Inventor: Albert Adams, c/o Transciterne S.A. B.P. 49, 1211 Geneve 13, Switzerland

[21] Appl. No.: 285,099

[22] PCT Filed: Nov. 24, 1980

[86] PCT No.: PCT/CH80/00144
§ 371 Date: Jul. 22, 1981
§ 102(e) Date: Jul. 22, 1981

[87] PCT Pub. No.: WO81/01537
PCT Pub. Date: Jun. 11, 1981

[30] Foreign Application Priority Data
Nov. 26, 1979 [CH] Switzerland ............. 10491/79

[51] Int. Cl.³ .................. B60P 3/42; B61D 3/16; B61D 17/00
[52] U.S. Cl. .................. 410/53; 105/159; 105/238 R; 105/405; 410/45

[58] Field of Search ............ 105/159, 238, 405; 410/45, 53

[56] References Cited

U.S. PATENT DOCUMENTS

| | | | |
|---|---|---|---|
| 2,709,969 | 6/1955 | Andert | 410/53 |
| 2,787,971 | 4/1957 | Obes | 410/53 X |
| 2,841,094 | 7/1958 | Schumacher | 410/53 |
| 2,896,552 | 7/1959 | Obes | 410/53 |
| 3,092,282 | 6/1965 | Tantlinger et al. | 410/53 X |
| 3,317,219 | 5/1967 | Hindin et al. | 410/53 |

*Primary Examiner*—Bruce H. Stoner, Jr.
*Assistant Examiner*—Howard Beltran
*Attorney, Agent, or Firm*—Emory L. Groff, Jr.

[57] ABSTRACT

A railroad car as a chassis of two parts and which are connected together by a coupling device. By lifting one end of the chassis by jacks it is possible to remove a railroad type truck and replace it with truck fitted with wheels and tires. The coupling is then opened and each half of the railroad car can be converted into a semi-trailer connected by means of a pivot to a tractor truck.

5 Claims, 10 Drawing Figures

FIG. 8
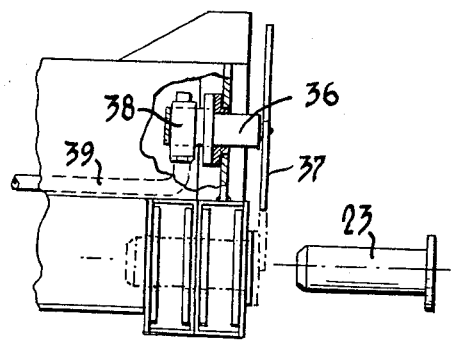
FIG. 9
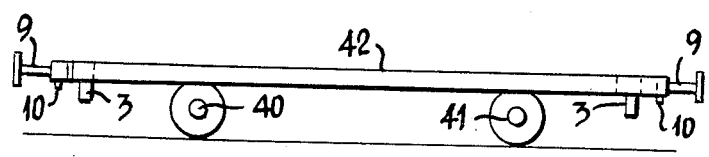
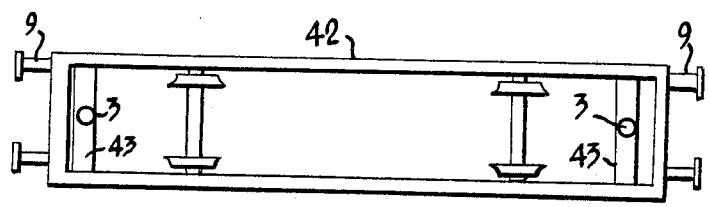
FIG. 10

CONVERTIBLE RAIL-HIGHWAY VEHICLE CHASSIS

For many years railroad companies have been trying to deliver to the address of the receiving party full car loads intended for users who do not have their own tracks.

Thus, they have succeeded in delivering cars of the so-called axle type, using especially lowered chassis.

A lowered chassis which makes possible the home delivery of truck cars was recently developed, but the sizes of such a device are such that it can only be used in exceptional cases.

There exists still another solution known as the "Kangaroo system" according to which there is moved by rail, on a car with lowered chassis, entire trucks or only semi-trailers. At departure and at arrival, the truck leaves the lowered car, generally under its own power, to go by road to the nearby location of the receiving party. Such a solution is very expensive, because the weight of the lowered car plus the weight of the truck, or semi-trailer, exceed the weight of the paying merchandise.

The object of the present invention is to provide a vehicle which makes possible mixed transportation, by road and by rail, of merchandise, without however ending with a vehicle which is too large or the empty weight of which is excessive relative to the transported merchandise.

The vehicle according to the present invention is characterized in that said vehicle comprises at least one axle of the rail type, meant to roll on railroad rails, said vehicle being further equipped, on the one hand with attachment means for at least one highway pneumatic wheel set and, on the other hand, with coupling means suitable to cooperate with a corresponding device of a semi-trailer truck tractor.

The attached drawing shows, schematically and by way of example, a preferred form of execution and a modification of a vehicle comprising the object of the present invention.

Figure 6:
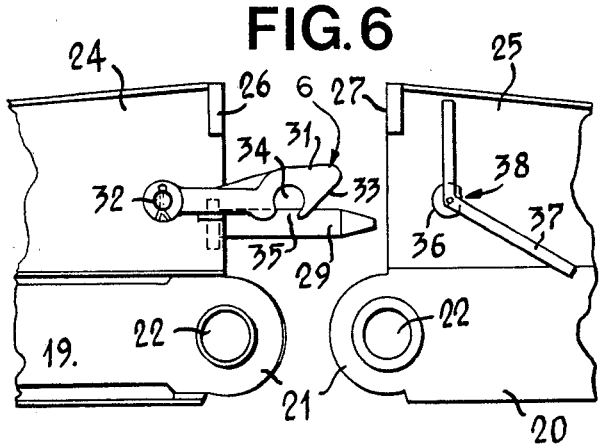
FIG. 6 is a side view of FIG. 5.
Figure 7:
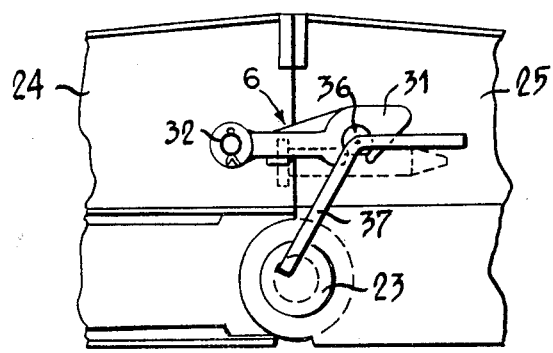

FIG. 7 corresponds to FIG. 6 but shows the coupling device in the engaged position.

FIG. 8 is an enlarged detail of the coupling device.

FIG. 9 is a side view of a modification as in the case of a two axle car.

FIG. 10 is a bottom plan view of the car according to FIG. 9.

Figure 1:
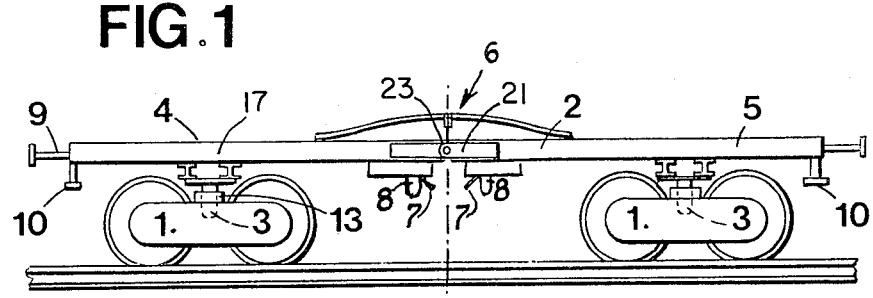
FIG. 1 is a side elevation of a vehicle according to the present invention.

The vehicle shown in FIG. 1 is a car with bogies or trucks 1 pivotally mounted at the ends of a chassis 2 on pivots 3. Chassis 2 is formed of two half-chassis 4 and 5 the length of which is approximately the same, and which are joined by connecting means 6 which will be described in detail below.

The facing or first ends of the chassis parts 4 and 5 are provided with couplers 7 which can cooperate with a corresponding coupling means of a semi-trailer tractor, and with a second pivot 8 similar to pivots 3. The car is fitted with buffers 9 and it comprises at both of its ends, supporting surfaces 10 for the jacks.

Figure 2:
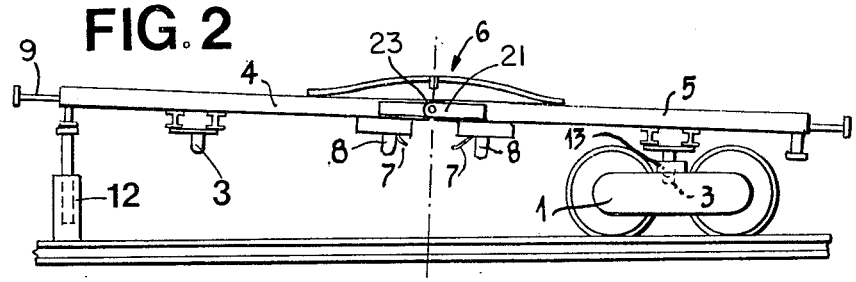
FIG. 2 is a side elevation showing the vehicle when one of its ends is raised by a jack.
Figure 4:
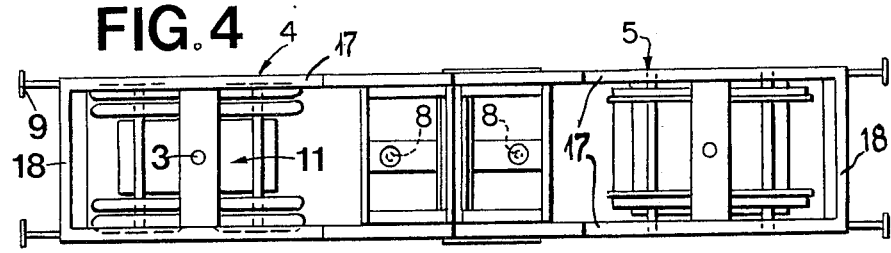
FIG. 4 is a top plan view, of a vehicle in the process of being transformed.

The car described is provided for conversion into two semi-trailer truck trailers, and FIGS. 2 and 4 illustrate different stages of that conversion.

The first operation consists in substituting the two trucks 1 of the railroad car with two sets of highway pneumatic wheel sets 11.

The replacement of a truck or bogie is a common one, especially for replacement of a defective truck or for the substitution of a narrow-gauge truck for a wide-gauge truck as is done, for example, at the Franco-Spanish border.

The replacement of a truck is done, as shown in FIG. 2, by lifting one side of the car by means of jacks 12, so as to release pivot 3 from connection with bearing 13 of the truck 1, in which it is placed. Truck 1 is then replaced with a set of highway pneumatic wheel sets 11 and chassis 2 is let down to place pivot 3 into part 14 of highway pneumatic wheel sets 11.

Once the trucks have been replaced, they are set into place under each half chassis and close to the coupling means 6. The supports 15 fitted with rollers 16, may also be part of the car equipment.

Figure 3:
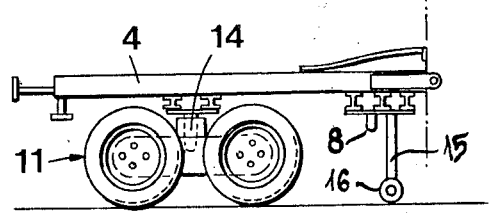
FIG. 3 is a side elevation of a portion of the vehicle converted into the trailer of a semi-trailer truck.

When the supports 15 are in place, it is possible to separate the two half chassis parts 4 and 5 from each other by releasing the connecting means 6. Each half chassis 4,5 equipped with the wheel setss 11, thus comprises a trailer, illustrated in FIG. 3, which is capable of being hitched to a traction vehicle. Of course, the wheel sets 11 cooperate with locking means which prevent it from rotating around pivot 3.

The conversion of the two trailers into a railroad car is done by proceeding in the reverse manner, placing the two trailers face to face, joining them with connecting means 6 and replacing the wheel sets 11 with trucks 1.

The transport of the trailers on the road preferably is achieved by a semi-trailer tractor, but it can just as well be ensured by any type of traction vehicle, when half chassis 4 is fitted with two wheel sets 11, with the second wheel set 11 being mounted on pivot 8.

The above-described vehicle presents the advantage of having a relatively low empty weight as compared to the weight of the transported merchandise, whether it is on a railway or a highway road, and the trailers created by the half chassis have the usual external dimensions, thus requiring no special convoys.

As illustrated in FIG. 4, the chassis 2 of the railroad car is formed of sills 17 connected by cross pieces 18. Sills 17 are formed of U-shaped profiles.

The connecting means 6 for the two parts 4 and 5 of the chassis of the railroad car is shown in detail in FIGS. 5 to 8. Each half sill 17 is reinforced near the middle of the car 2 with a member 19,20, each provided with axially projecting means as tabs 21 each having an opening 22. These tabs 21 may be axially coupled by the introduction of retainer means such as a peg 23 into the openings 22 which thus are held in a lined-up position relative to each other.

In order to lock the two parts of the car which is obtained by the introduction of peg 23 into openings 22, the connecting means 6 also has on each side uppermost abutment means comprising a stop member 24 and 25, the surfaces 26 and 27 of which come into mutual contact under the effect of the weight of the railroad car.

Figure 5:
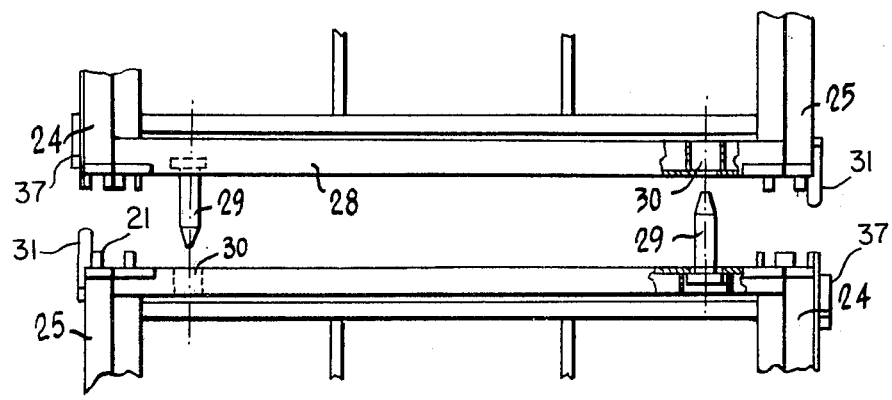
FIG. 5 shows in plan and on an enlarged scale, the coupling device of the two parts of the vehicle, in disengaged position.

As shown in FIG. 5, stop member 24 is connected by means of a cross piece 28 to the other stop member 25 of the same half car. Each one of those cross pieces is provided with a finger 29 and a hole 30 disposed so as to engage with hole 30 and finger 29 of the opposite cross piece.

After introduction of pegs 23 into openings 22, parts 24 and 25 are firmly held in contact by means of cooperating locking means including a pivoted hook 31 which pivots in end 32 of stop member 24. Said hook 31 has an oblique nose 33 and a hollowed out portion forming a notch 34 the general shape of which is circular, the opening 35 of the notch being of a width less than the diameter of said hollowed out portion. Hook 31 cooperates with a rotating rod 36 fitted with a two arm handle 37 which has a flat part 38 so that, in the position illustrated in FIG. 6, it is possible to engage hook 31 on said rod 36. After hook 31 has been set into place, handle 37 is operated to bring rod 36 to the position illustrated in FIG. 7. In that way, hook 31 no longer can become disengaged from rod 36 as long as said rod has not been set back into the position in FIG. 6. It should be noted that in the position in FIG. 7, one arm of handle 37 is positioned facing the head of peg 23, and thus blocks the latter in its position of engaging in openings 22.

As shown in FIG. 8, the manipulation of handle 37 makes it possible to operate, through rod 36, a valve 38 provided on the compressed air duct 39 of the well known automatic brake of trains. Thus, when handle 37 is manipulated for the purpose of uncoupling parts 4 and 5 of the railroad car, the main duct of compressed air is first closed even when the compressed air connections between cars have not been uncoupled.

FIGS. 9 and 10 relate to a modification which makes possible conversion into a semi-trailer of an ordinary railroad car with two axles 40 and 41. Said car comprises, in the usual manner, a chassis 42 fitted with buffers 9. At each end, chassis 42 carries support parts 10 and a pivot 3, the latter being fixed on a cross-piece 43. The distance between each pivot 3 and the closest axle must be sufficient to permit the passage of the rear part of the chassis of a tractor truck.

As before, one end of the car is lifted by means of jacks placed under support parts 10, to make possible the exchange of a railroad axle for a road-type axle. In principle, the railroad axle or truck can be left in place, and a tractor truck is then coupled to pivot 3 which is located at the end of the car opposite the one equipped with the road-type axle.

I claim:

1. A convertible vehicle for railway and highway transportation, comprising a two part chassis, each part having a first end engageable with the other part first end to provide a single chassis for railway transportation and disengageable from one another to provide two separate trailers for highway transportation, chassis connecting means joining said first end of one part of said chassis to the first end of the other part at approximately the middle of said chassis, each said two parts including a coupling device adjacent said end having said connecting means, each said coupling device engageable with related coupling means of a highway tractor vehicle, said chassis connecting means permitting selective rigid connection of said two parts and the separation thereof from each other, said chassis connecting means including cooperating longitudinal alignment means on said two first ends, abutment means on the upper portion of each said chassis part first end, means projecting axially from each said part first end beneath said abutment means, said projecting means of one said first end laterally aligned with said projecting means of said other first end when said abutment means of said two first ends are in mutual contact, retainer means engageable with said laterally aligned projecting means, cooperating locking means carried by both said first ends operable to secured said two chassis parts with said abutment means engaged, each of said chassis parts having a second end, and mounting means near each said second end to permit the engagement and disengagement of railroad trucks and wheel sets for highway use therefrom.

2. A vehicle according to claim 1, wherein each said part first end is provided with a cross piece, said alignment means on each said cross piece include opposed fingers and holes respectively mating upon mutual contact between said first two ends.

3. A vehicle according to claim 1, wherein the two chassis parts of the vehicle include lateral half-sills, said projecting means including tabs at said half-sill ends each having an opening, said retainer means comprising a peg engaged in said openings and said abutment means includes stop members affixed to the ends of said half-sills whose surfaces come into mutual contact under the effect of the weight of the chassis parts.

4. A vehicle according to claim 3, wherein said locking means includes a pivoted hook affixed to one of said stop members and engaging means on the other of said stop members to hold them in contact with each other, said last mentioned means comprising a rotatable rod, a two arm handle mounted on one end thereof, a valve on the compressed air duct of a vehicle brake with which said rod cooperates, one of the two arms of said handle positioned so as to face said peg to block it in position when it is engaged in said openings.

5. A vehicle according to claim 4, wherein said compressed air duct valve is manipulated concurrently with displacement of said handle.

* * * * *